United States Patent [19]
Eckermann et al.

[11] Patent Number: 6,131,729
[45] Date of Patent: Oct. 17, 2000

[54] CONTAINER CARRIER

[75] Inventors: Jens Eckermann; Hilger Scheelcke, both of Bremen; Bernhard Skolik, Bassum, all of Germany

[73] Assignee: FCP Europa Carton Faltshachtel GmbH, Hamburg, Germany

[21] Appl. No.: 09/191,409

[22] Filed: Nov. 12, 1998

[30] Foreign Application Priority Data

Nov. 17, 1997 [DE] Germany ........................ 297 20 346 U
Jun. 18, 1998 [DE] Germany ........................ 298 10 883 U

[51] Int. Cl.[7] .................................................. B65D 75/00
[52] U.S. Cl. ........................... 206/178; 206/173; 206/180
[58] Field of Search .................... 206/173–176, 206/178–180, 187–188

[56] References Cited

U.S. PATENT DOCUMENTS

| | | | |
|---|---|---|---|
| 3,266,663 | 8/1966 | Ringler | 206/178 |
| 3,278,076 | 10/1966 | Graser | 206/173 |
| 3,554,401 | 1/1971 | Wood | 206/178 |
| 3,661,297 | 5/1972 | Wood | 206/178 X |
| 3,670,948 | 6/1972 | Berg | 229/117.06 |
| 3,712,505 | 1/1973 | Slevin | 206/187 X |
| 4,205,748 | 6/1980 | Wilson | 206/174 |
| 4,469,222 | 9/1984 | Graser | 206/180 |
| 5,680,930 | 10/1997 | Stone | 206/173 |
| 5,947,273 | 9/1999 | Dalrymple et al. | 206/178 |

FOREIGN PATENT DOCUMENTS

| | | |
|---|---|---|
| 179 388 | 10/1985 | European Pat. Off. . |
| 0 733 560 | 3/1996 | European Pat. Off. . |
| 3 02 432 | 5/1903 | Germany . |
| 2 122 477 | 11/1972 | Germany . |
| 28 36 826 | 3/1980 | Germany . |
| 30 33 733 | 5/1982 | Germany . |
| 38 07 960 | 9/1988 | Germany . |
| 196 02 358 | 3/1997 | Germany . |

*Primary Examiner*—Bryon P. Gehman
*Attorney, Agent, or Firm*—Vidas, Arrett & Steinkraus, P.A.

[57] ABSTRACT

A container carrier with a box-shaped carrier container of a first foldable flat material, with a floor wall, lateral walls and end walls; with a middle wall parallel to the lateral walls, of a further foldable flat material with transverse flaps which can be folded out, for forming compartments for the containers. The first foldable flat material is a reinforced cardboard and the second foldable flat material is a recycling cardboard.

43 Claims, 8 Drawing Sheets

CONTAINER CARRIER

BACKGROUND OF THE INVENTION

The invention relates to a container carrier in particular for the accommodation of bottles, which comprises a box-shaped carrier container and a middle wall arranged therein with a transverse flap which can be folded out for forming compartments.

Such container carriers are known. With this the container carrier may be closed to the top or may be designed basket-like with a carrier container open at the top and with a carrier handle of the middle wall protruding beyond this ("open basket carrier"). Further it is known to manufacture such container carriers of two flat blanks of reinforced cardboard of which the one forms the carrier container and the other the middle wall. If such container carriers are manufactured from a one-piece blank of a foldable flat material, relatively much material is required. Therefore there are also already known container carriers reducing the material expense, which are for example described in DE-OS 28 36 826 and in DE-OS 30 33 773. According to the last mentioned document such container carriers may be manufactured and bottles packed therein in that the middle wall from above is placed between a bottle group and the carrier container blank is folded around the arrangement of the container group and the middle wall and is connected to this. According to DE-PS 196 02 358 instead of this also middle walls may be guided laterally to container groups of a first container row and thereafter container groups of a second container row allocated to the middle walls and subsequently blanks of the carrier container laid around the container groups with the middle walls.

BRIEF SUMMARY OF THE INVENTION

Proceeding from this it is the object of the invention to provided a container carrier of the initially mentioned type with a further decreased material or production expense.

The object is achieved by a container carrier with the features of claim 1. Advantageous formations of the container carrier are specified in the dependent claims.

The container carrier according to the invention has a box-shaped carrier container preferably open to the top, of a first foldable flat material with a floor wall (i.e. bottom wall), lateral walls and end walls. The first foldable flat material is a reinforced cardboard. Further the container carrier has a middle wall parallel to the lateral walls, preferably with a carrier grip arranged thereon, the middle wall consisting of a further foldable flat material and comprising folded out transverse flaps for forming compartments for the containers. The second foldable flat material is a recycling cardboard which is preferably not coated. Preferably the carrier container is formed from a one-piece blank of the reinforced cardboard and preferably the middle wall is formed from a one-piece blank of the recycling cardboard.

By way of the various materials of the carrier container and the middle wall with a reduced cost a shape-stable and carrying-secure container carrier is achieved. Changes in expense result from the fact that the expensive reinforced cardboard is only used for the carrier container (casing), where on the other hand for the middle wall a very inexpensive recycling cardboard is used. This likewise assumes a carrying function, which by way of a multi-layered design and adhesing or other connection of the layers to one another and of the middle wall to the carrier container, may be further reinforced. As a result of this the surface of the carrier container may be reduced with respect to conventional container carriers consisting totally of reinforced cardboard. Further savings result in that by way of the manufacture of the carrier container and the middle wall of varying materials a more favorable material use ("sheet division") and a higher pressure rate are achieved. For the further change in expense uncoated material may be used for the middle wall and a printing of the middle wall may be completely done away with.

Basically the blanks for the carrier container and the middle wall may be designed as with the initially mentioned designs, preferably as one-piece blanks. The carrier container may at the transverse sides have lateral and end walls linked to one another, wherein only between a lateral wall and an end wall is there given a connection by way of a lateral tab of one of these two walls. Then the carrier container has two completely closed end walls which permit an unseparated pressure picture which is not disturbed by register differences. Such register differences may occur with separated end walls whose end wall sections have overlapping end wall tabs which are adhesed to one another. The carrier container may however also have only one completely closed end wall with which the previously mentioned advantage with respect to the pressure picture comes to light, and a parted lateral wall. With this the carrier container on the transverse sides may have lateral and side walls linked to one another. Finally the carrier container may however also have two parted end walls. The carrier container may then be manufactured of a one-piece blank which comprises two sections connected via linkages of the end wall tabs. Thus the various embodiments may have special advantages with the folding process.

With loading tests of carrier containers with a middle wall comprising a carrier grip it has been shown that particular loadings and deformations may occur on the end walls and the neighbouring regions of the longitudinal walls. For alleviating these disadvantages according to the invention there is provided at least one end wall with a reinforcement, which preferably is formed by at least one additional layer of foldable material connected to it. Preferably this reinforcement is arranged at least in one lower section of the end wall. It may be formed by a reinforcement section linked to the end wall and folded against this, by an end tab on the middle wall, by a reinforcement part separated from the middle wall or from an additionally incorporated reinforcement part separate from the carrier container and middle wall. It is also possible that with one and the same container carrier various embodiments of the reinforcement are realized, e.g. an end tab at one end of the middle wall and reinforcement sections which are allocated to the remaining sections of the end walls.

Further, formations of the middle wall are advantageous in which this, proceeding from the carrier grip up to its connection to at least one end wall, floor wall and/or the lateral wall of the carrier container, is designed multi-layered with a connection between the layers, in particular when it is the case of a flat connection by way of an adhesive or glue. The regions of the middle wall reinforced in such a way effect a force transmission from the carrier grip into the carrier container and encourage the stability of the particularly loaded carrier grip and the whole container carrier.

In the dependent claims there are specified blanks for the carrier container and the middle wall, which are formed corresponding to the above.

BRIEF DESCRIPTION OF THE DRAWINGS

The invention is hereinafter described in more detail by way of the accompanying drawings of embodiment examples. In the drawings there are shown.

DETAILED DESCRIPTION OF THE INVENTION

In the subsequent description of the various embodiment examples for the corresponding design elements the same reference numerals are used. In as far as this is concerned the description is valid for all embodiments concerned.

Figure 1:
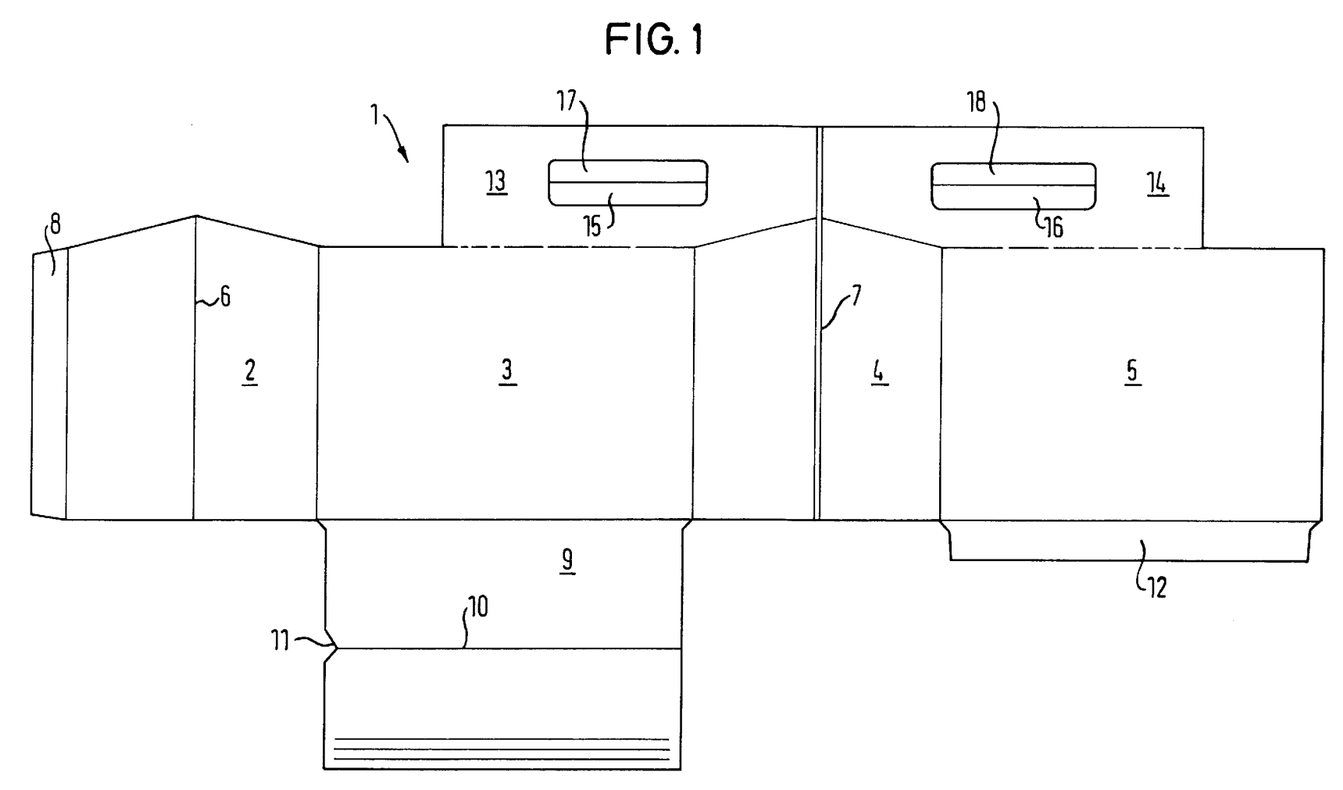
FIG. 1 a flatly opened out blank of a carrier container of a container carrier with completely closed end walls, in a plan view.

According to FIG. 1 the blank 1 for the carrier container, manufactured as one-piece from reinforced cardboard, on the transverse side linked to one another has an end wall 2, a lateral wall 3, an end wall 4 and a lateral wall 5. The end walls 2, 4 comprise in each case a middle fold line 6, 7. The later is formed as a double fold line. The upper edge of the two end walls 2, 4 in each case is formed increasing to the middle fold line 6, 7 on both sides. The end wall 2 has a lateral tab 8 on one side.

The lateral walls 3, 5 are in each case formed rectangular. The lateral wall 3 has on the lower longitudinal edge a floor wall 9 which is subdivided in the longitudinal direction by a middle fold line 10. On one end of the middle fold line 10 the floor wall 9 comprises a receiver 11 for a hook, which has the shape of a triangle open on one side with the tip aligned to the middle fold line. The lateral wall 5 has a floor tab 12 on the lower edge.

At the upper edge of the end wall 4 and of a part of the lateral walls 3, 5 the blank 1 has grip sections 13, 14 which are formed symmetrically with respect to the middle fold line which extends through these. The grip sections 13, 14 are separably connected to the end wall 4 and to the lateral walls 3, 5 via pressed punchings. They in each case have a grip opening 15, 16 in each case with a tab 17, 18 in the end region which can be folded out and which serves for a gentle force transmission into the inner surface of the hand and for grip reinforcement.

Figure 2:
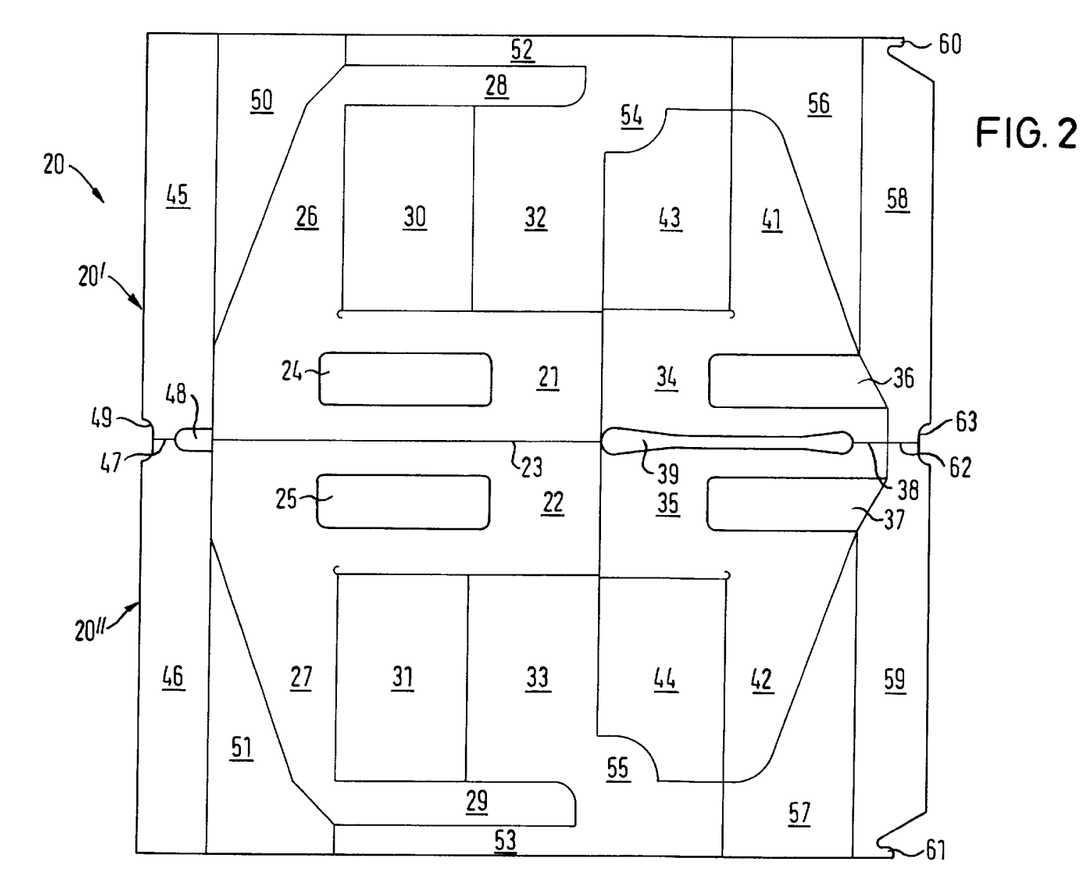
FIG. 2 a flatly opened out blank of a middle wall of the same container carrier in a plan view.

The blank 20 for a middle wall, which is shown in FIG. 2 is punched from an uncoated recycling cardboard. It has two sections 20', 20" which are linked to one another on the longitudinal side at 23. The sections 20', 20" have grip sections 21, 22 which respectively comprise a grip opening 24, 25. The grip sections 21, 22 have in each case a lateral connection section 26, 27 which is extended away from the linking 23. At the foot of each lateral connecting section 26, 27 there is formed a lower connecting section 28, 29 which extends parallel to the linking line 23.

In the L-shaped corner region between the grip section 21 and the lateral connecting section 26 and between the grip section 22 and the lateral connecting section 27 on the lateral connecting section 26 and 27 there is linked a transverse flap 30 and 31 respectively, to which in turn on the other side there is linked a transverse flap connecting tab 32 and 33 respectively.

To the side of the grip sections 21, 22 opposite the lateral connecting sections 26, 27 there are linked inner grip sections 34, 35 which have grip openings 36, 37 and partly are formed complementarily to the grip sections 21 22. The inner grip sections 34, 35 are connected to one another via a linking 38 which is interrupted by an approximately dumbbell-shaped recess 39. At the side opposite their linkings to the grip sections 21, 22 the inner grip sections 34, 35 in each case have an inner connecting section 41, 42, wherein the inner connecting sections extend away from the joining-linking 38 of the inner grip sections 34, 35.

In the L-shaped corner region between the inner grip sections 34, 35 and the inner connecting sections 41, 42 there are arranged transverse flaps 43, 44 which on the one side are linked to the inner connecting sections 41 and 42 respectively and on the other side are linked to the transverse flap connecting tabs 32, 33.

To the side of the grip sections 21, 22, on which the lateral connecting sections 26, 27 are arranged, there are linked edge tabs 45, 46 which are linked to one another at 47, wherein this linking to one another is interrupted by an oval relief 48 and a semi-oval relief 49.

In the continuation of its linking to the grip sections 21, 22 the edge tabs 45, 46 have linked-on end tabs 50, 51. On the oppositely lying side these end tabs 50, 51 have outwardly linked-on end side tabs 52, 53 which are connected to the transverse flap connecting tabs 32, 33 via arc-shaped sections 54, 55.

Furthermore the end side tabs 52, 53 have further end tabs 56, 57 linked onto the end lying opposite their linking to the end tabs 50, 51. These in turn have further edge tabs 58, 59 which are linked to the side lying opposite their linking to the end side tabs 52, 53 and which in each case on their outer edge comprise a hook section 60, 61. Moreover the further edge tabs 58, 59 are linked to one another at 62, wherein this linking to one another is limited at the side of a semi-oval recess 63.

Inasmuch as the lines shown in FIG. 2 according to the above description are not described as connecting or linking lines, it is the case of punching lines which separate neighboring regions of the recycling cardboard or untreated cardboard from one another.

The blank 20 is processed further into a middle wall in the following manner:

Firstly the inner grip sections 34, 35 are folded against the grip sections 21 and are adhesed to these largely flat.

Afterwards the edge tabs 45, 46 are folded against the inner sides of the grip sections 21, 22 and of a part of the connecting sections 26, 27 and are adhesed to these. Moreover the further end tabs 56, 57 are folded about their linkings to the end side tabs 52, 53, by which means the further edge tabs come to bear on the inner grip sections 34, 35 with which they likewise are flatly adhesed.

Afterwards the middle wall sections formed by the grip sections 21, 22 with the associated lateral connecting sections 26, 27, along with the parts folded thereon, are folded together, wherein the edge section 45 is adhesed flatly to the edge section 46, the regions of the grip sections 21, 22 not covered by this and the lateral connecting sections 26, 27 are flatly adhesed to one another, the further edge section 58 is flatly adhesed to the further edge section 59 and the regions of the inner grip sections 34, 35, which are not covered by this and the inner connecting sections 43, 44 in each case are flatly adhesed to one another. Subsequently the blank 20 is situated in the configuration shown in FIG. 3.

Figure 3:
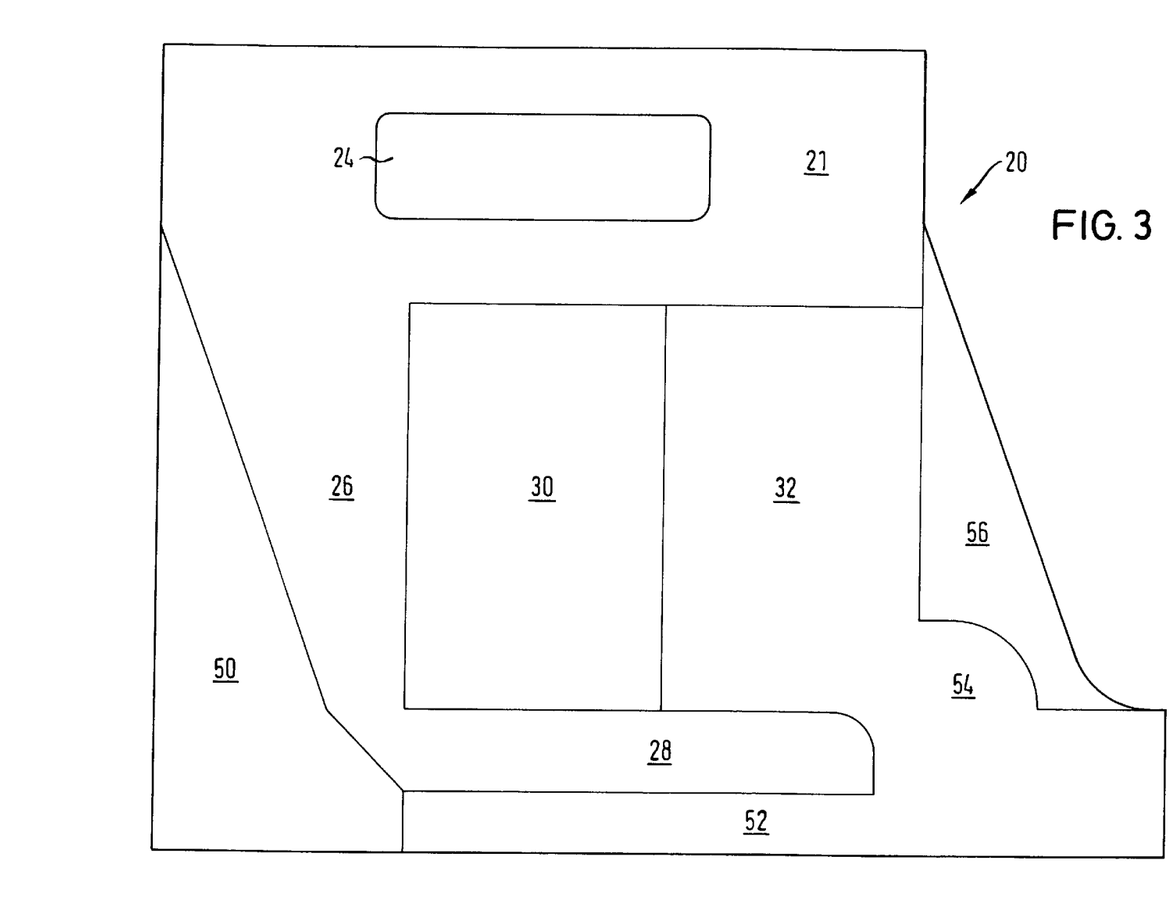
FIG. 3 the flatly arranged middle wall of the same container carrier in the plan view.

In this configuration the middle wall 20 is connected to the blank 1 of the carrier container. For this the grip sections 21, 22 are flatly adhesed to the inner sides of the grip sections and the end tabs 50, 51 are flatly adhesed to the inner sides of the end wall 4, wherein the bordering edge of the middle wall is aligned to the middle fold line 7. Furthermore the end side tabs 52, 53, the arc-shaped sections 54, 55 as well as the transverse flap connecting tabs 32, 33 are in each case adhesed flatly to the inner sides of the lateral walls 3, 5.

Thereafter the section 1 by adhesing the lateral tab 8 to the inner side of the lateral wall 5 may be closed to a casing. Furthermore the floor wall 9 may be closed by way of folding together about the middle fold line 10 and adhesing to the floor tab 12. Afterwards the blank I for the carrier container is located in the flatly lying configuration with an incorporated middle wall shown in FIG. 4.

Figure 4:
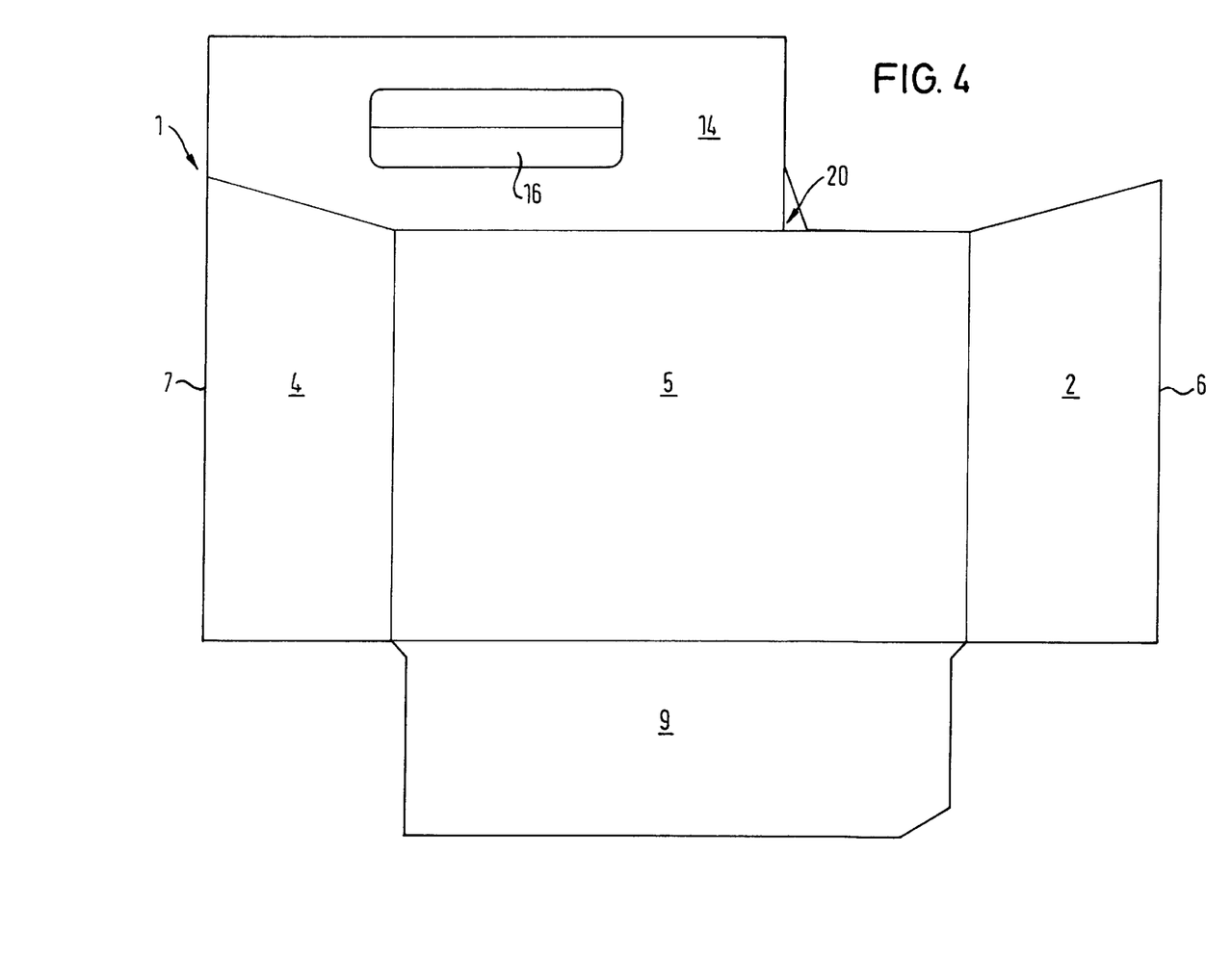
FIG. 4 the container carrier lying flat in the plan view.

For assembling the container carrier one must then only press against the middle fold lines 6, 7. As a result of this the end walls 2, 4 align perpendicularly to the lateral walls 3, 5, the transverse flaps 30, 31, 43, 44 align perpendicularly to the lateral walls 3, 5 and the floor 9 is spread out between the lateral walls 3, 5. In the completely spread out arrangement the further end tabs 56, 57 come to bear on the inner side of the end wall 2 and the hook formed by the hook sections 60, 61 snaps under the receiver 11 of the floor, by which means the carrier container is stabilized in the assembled position and the floor is supported. Where appropriate the further end tabs 56, 57 may be adhesed to the end wall and/or the hook formation may be omitted.

With the presence of a hook 60, 61 however the container carrier after use may be laid together flatly and disposed of.

Furthermore it is particularly advantageous that from the grip openings 15, 16 the force transmission within the blank 20 into the blank 1 is effected via multiple plied layers of untreated cardboard stabilized by adhesings. Furthermore the container carrier is stabilized on the circumference in that the end tabs 50, 51, 56, 57 together with the end side tabs 52, 53 form an annular deepening on the inner side of the carrier container.

Figure 5:
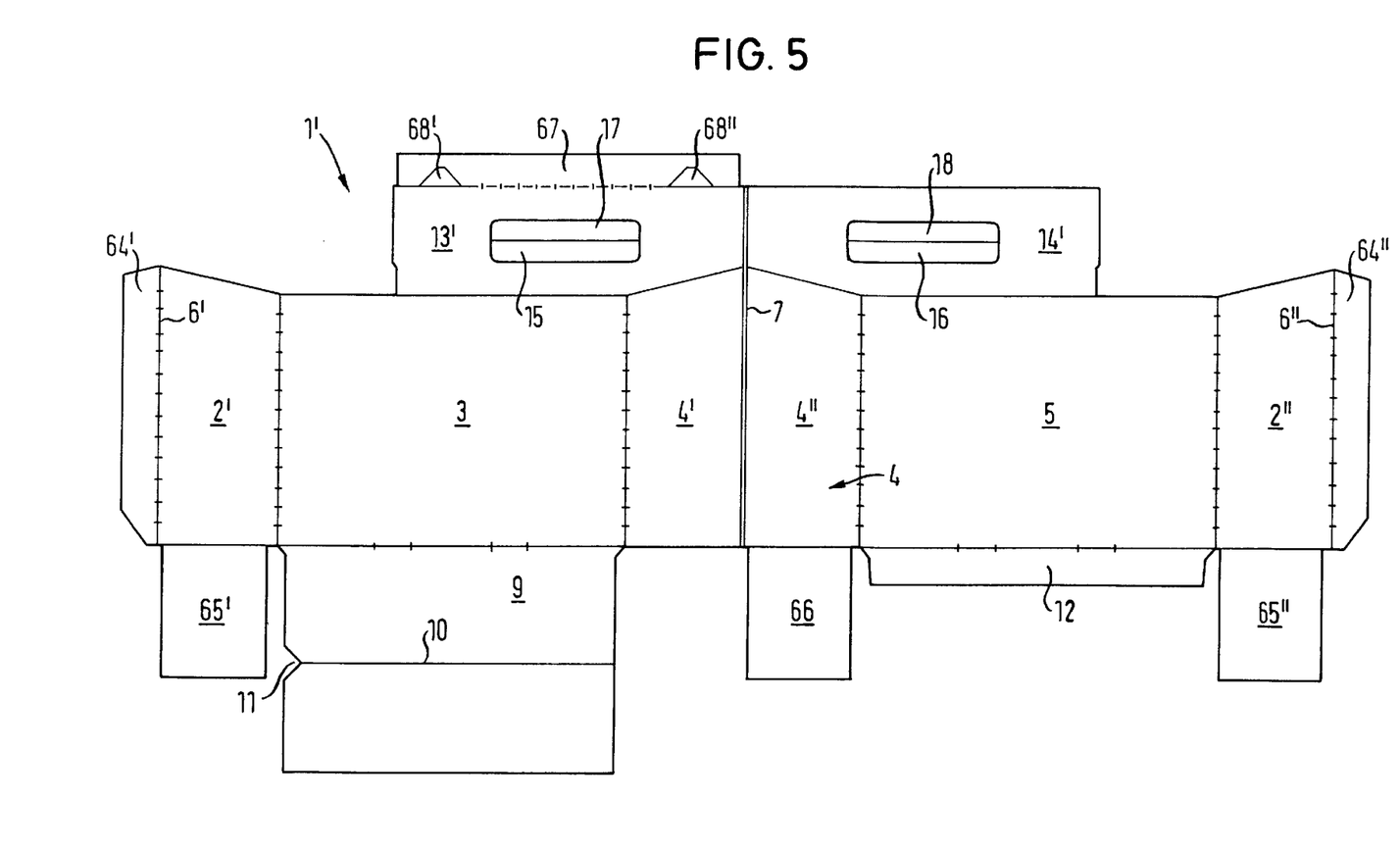
FIG. 5 a flatly opened out blank of a carrier container of a container carrier with only one completely closed end wall in the plan view.

According to FIG. 5 the blank 1' manufactured as one piece from reinforced cardboard for the carrier container, has linked to one another on the transverse side a lateral wall section 2', a lateral wall 3, an end wall 4, a lateral wall 5 and a further end wall section 2". The end wall 4 is divided by a middle fold line 7 in end wall sections 4', 4". The end wall sections 2, 2" have on the sides distant to the lateral walls 3, 5 in each case an end wall tab 64, 64" linked at 6', 6".

The lateral wall 3 has at the lower longitudinal edge a floor wall 9 which is subdivided in the longitudinal direction by a middle fold line 10. At one end of the middle fold line 10 the floor wall 9 has a receiver 11 for a hook. The lateral wall 5 has at the lower edge a linked floor tab 12.

Rectangular reinforcement sections 65', 65", 66 are linked to the lower edges of the end wall sections 2'2" and of the right end wall section 4" of the end wall 4. Their width corresponds almost to those of the end wall sections 2', 2", 4" carrying them. Their height is roughly half as large as those of the end wall sections 2, 2", 4" carrying them.

On the upper edge of the end wall 4 and of part of the lateral walls 3, 5 the blank 1 has grip sections 13', 14' which are arranged symmetrically with respect to the middle fold line 7 which extends through these. The grip sections 13', 14' are separably connected to the end wall 4 and the lateral walls 3, 5 via bridged punchings. In each case they have a grip opening 15, 16 with in each case a tab 17, 18 which can be folded out, in the upper edge region. The grip section 13' above has linked a grip edge tab 67. This comprises in the linking region trapezoidal insert openings 68', 68". The grip edge tab 67 serves the grip reinforcement and the additional fixation of a middle wall.

Figure 6:
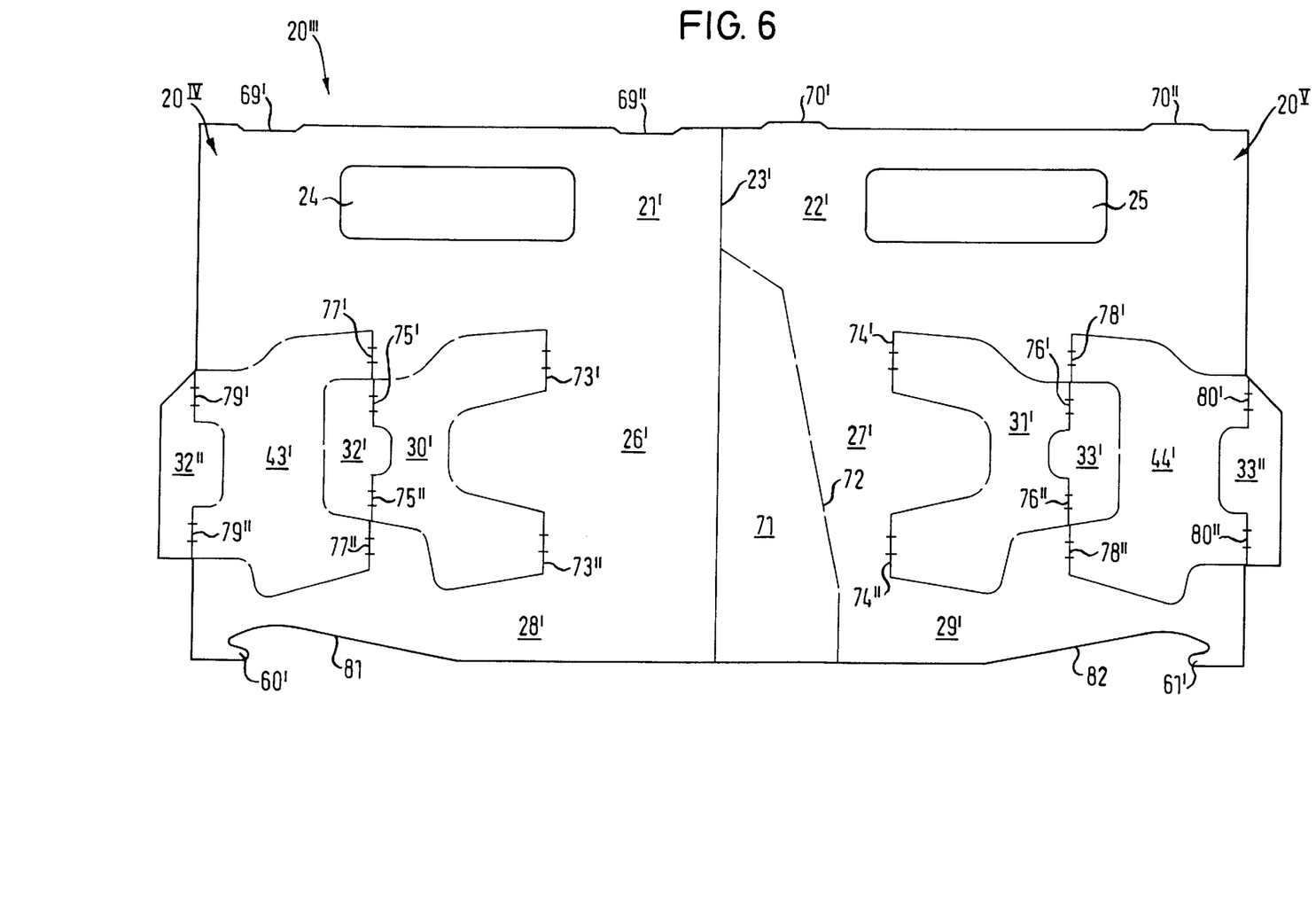
FIG. 6 a flatly opened out blank of a middle wall of the same carrier container in a plan view.

A blank 20''' of the middle wall is shown in FIG. 6. This is punched as one piece from an uncoated recycling cardboard. It has two sections $20^{IV}$, $20^V$ which are linked to one another on the longitudinal side at 23'. The sections $20^{IV}$, $20^V$ have grip sections 21', 22' which in each case comprise a grip opening 24, 25. The grip section 21' has at the upper end region trapezoidal cutouts 69', 69". The grip section 22' at the upper end has trapezoidal insert tabs 70', 70".

The grip sections 21', 22' below have in each case a lateral connecting section 26', 27' which is extended away from the linking 23'. The section $20^V$ has, next to the lateral connecting section 27', an end tab 71. This on the one side in the continuation of the linking 23' is linked to the lateral connecting section 26' and on the other side to the lateral connecting section 27' via a bridged punching 72. The bridged punching 72 has on the lower edge of the section $20^V$ a distance to the lateral connecting section 26' and gradually comes closer to this with an increasing height until it intersects the linking 23'. Thus the end tab 71 may be folded out of the section $20^V$.

From the foot of each lateral connecting section 26', 27' a lower connecting section 28', 29' is extended away roughly perpendicular to the linking 23'.

In the L,-shaped corner region between the grip part 21' and the lateral connecting section 26' and between the grip section 22' and the lateral connecting section 27' there are respectively linked to the lateral connecting sections 26' and 27' a transverse flap 30' and 31', to which in turn on the other side a transverse flap connecting tab 32' and 33' are respectively linked. So that the transverse flaps 30', 31' may be folded out of the sections $20^{IV}$, $20^V$ about their linking line 73', 73" and 74', 74" they are further separated from these by way of (bridged) punchings. The same applies to the transverse flap connecting tabs 32', 33' which are connected to the transverse flaps via linkings 75', 75" and 76', 76" distanced from one another.

Furthermore via linkings 77', 77" and 78', 78" transverse flaps 43', 43" are linked to protruding sections of the grip section 21' and of the lower connecting section 28' as well as of the grip section 23' and the lower connecting section 29'. The transverse flaps 43', 43" likewise have transverse flap connecting tabs 32", 33" linked at the other end at 79', 79" and 80', 80". The transverse flaps 43', 44' and the transverse flap connecting tabs 32", 33" are otherwise likewise so limited by (bridged) punching lines that they are pivotable about their linkings.

The lower connecting sections 28', 29' over the proximity of their end distant to the lateral connecting sections 26', 27' comprise a hook section 60', 61' prior to which there is arranged a roughly returning lower edge region 81, 82 of the lower connecting section 28', 29'.

For the manufacture of a container carrier firstly the connecting sections 65', 65" and 66 are folded against the inner sides of the end wall sections 2', 2" , 4" and are adhesed to these. Then the blank 20" is placed on the inner side of the blank 1' such that the linking 23' is arranged approximately on the middle fold line 7 and the insert tabs 70', 70" over the insert openings 68', 68". At the same time the grip section 21' is adhesed to the grip section 14', the grip section 22' to the grip section 13', the end tab 71 to the end wall section 4', the transverse flap connecting tabs 32', 32" to the lateral wall 5 and the transverse flap connecting tabs 33', 33" to the lateral wall 3.

Furthermore the grip edge tab 67 is folded against the grip section 21 and is adhesed to this, wherein the insert tongues 70', 70" are caught by the insert openings 68', 68".

Thereafter the end wall sections 2', 2" are folded inwards and the end wall tabs 64', 64" are adhesed to the grip sections 22', 21' and the lower connecting sections 29', 28'.

Further the sections of the blank 1' separated by the middle fold line 7 are folded against one another. With this the end wall sections 64', 64", the grip sections 21', 22", the lateral connecting sections 26', 27' and the lower connecting sections 28', 29' are in each case adhesed to one another.

Finally the floor wall 9 is folded about the middle fold line 10 against the floor tab 12 and is adhesed to this.

The container carrier manufactured in such a manner may be simply assembled in that one presses against the middle fold line 7 and the transverse sides of the lateral walls 3, 5, which are distant to this line. With this the transverse flaps 30', 31', 43', 44' and the end tab 71 in each case whilst destroying still present bridges of their punchings, are folded out of the middle wall 20'". Further the floor 9 is stretched out and may be snapped into the hooks 60', 61 with its receiver 11, by which means the whole design is stabilized in the assembled position.

The resulting container carrier is reinforced on the end wall 2', 2" by the reinforcement sections 65', 65" and on the lateral wall 4 by the reinforcement section 66 as well as the end tab 71 adhesed at the inside.

Figure 7:
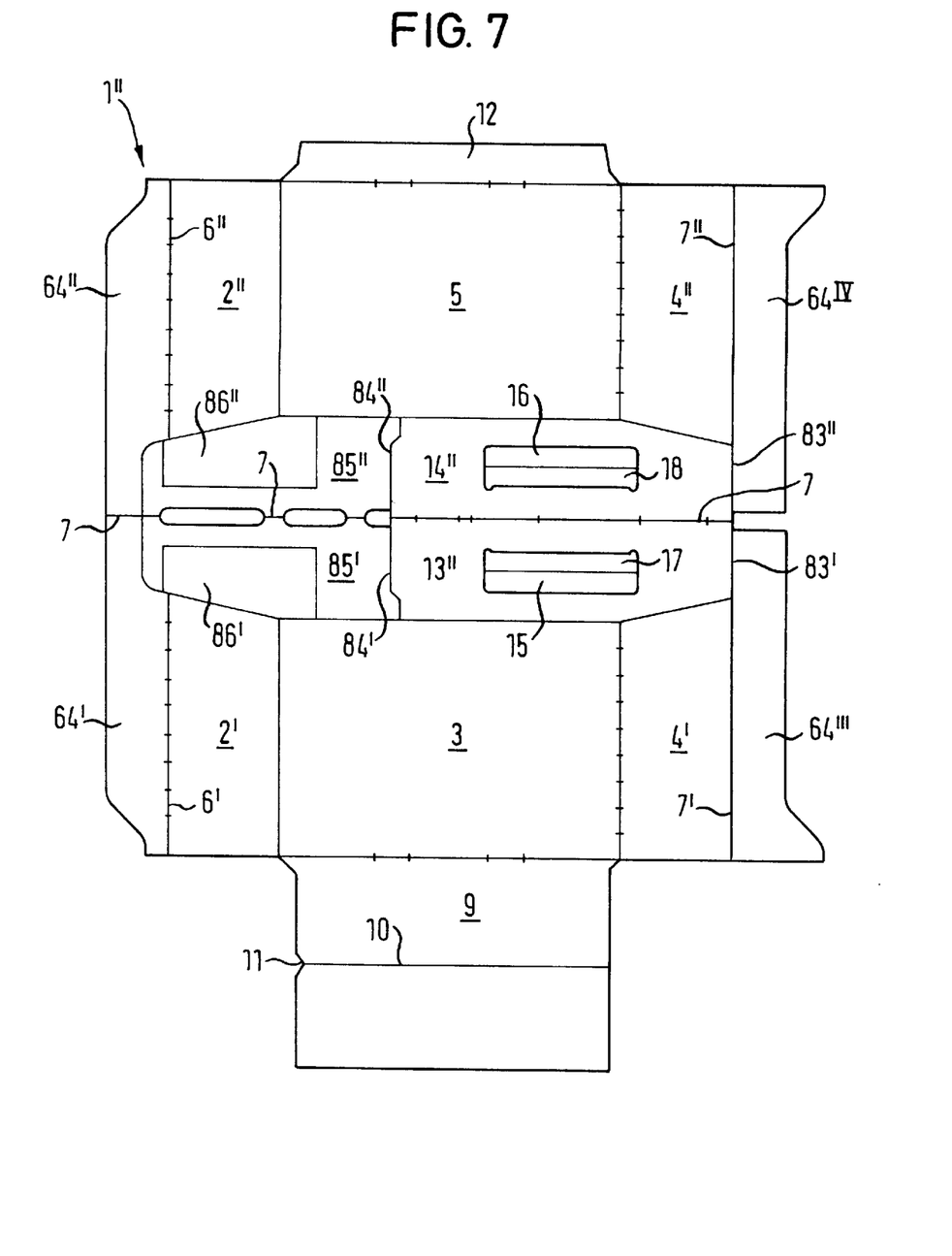
FIG. 7 a flatly opened out blank of a carrier container with two parted end walls, in a plan view.

The blank 1" for a carrier container shown in FIG. 7 is manufactured as one piece from reinforced cardboard. With this an end wall section 2', a lateral wall 3 and an end wall section 4' are linked to one another on the transverse side. The lateral wall 3 has on the lower longitudinal edge a floor wall 9 which is subdivided in the longitudinal direction by a middle fold line 10. On the middle fold line 10 in turn there is present a receiver 11 for a hook.

Furthermore the blank has an end wall section 2", a lateral wall 5 and an end wall section 4", which likewise are linked to one another on the transverse side. On the lower longitudinal edge of the lateral wall 5 there is linked a floor tab 12.

To the transverse sides of the end wall sections 2', 2" which lie opposite their linkings to the lateral walls 3, 5 there arc linked end wall tabs 64', 64" at 6', 6". Accordingly to the transverse sides of the end wall sections 4', 4" which lie opposite their linkings to the lateral walls 3, 5 there are linked end wall tabs 64''', 64$^{IV}$ at 7', 7".

The blank 1" has two sections which are connected to one another via a longitudinally aligned middle fold line 7'. Via this linking 7' the end wall tabs 64', 64" are directly connected to one another. Furthermore via the linking 7' grip sections 13", 14" are connected to one another, which on the transverse side at 83', 83" are linked to the end wall tabs 64''', 64$^{IV}$. The grip sections 13", 14" comprise grip openings 15, 16 and tabs 17, 18 which can be folded out. Furthermore the grip sections 13", 14" are releasably fastened to the upper edges of the lateral walls 3, 5, and end wall sections 4', 4", which face one another, via bridged punchings.

To the transverse side of the grip section 13", 14" opposite their linkings 83', 83" at 84', 84" there are linked inner grip sections 85', 85" between which likewise the linking 7' extends, which here is partly interrupted by punching-outs. The inner grip sections 85', 85" comprise in the middle region larger punching-outs 86', 86" so that after folding about the linkings 84', 84" against the grip sections 13", 14" their openings remain free. For folding about the linkings 84', 84" the inner grip sections 85', 85" are merely connected to the lateral walls 3, 5 and end wall tabs 64', 64" via bridged punchings.

Figure 8:
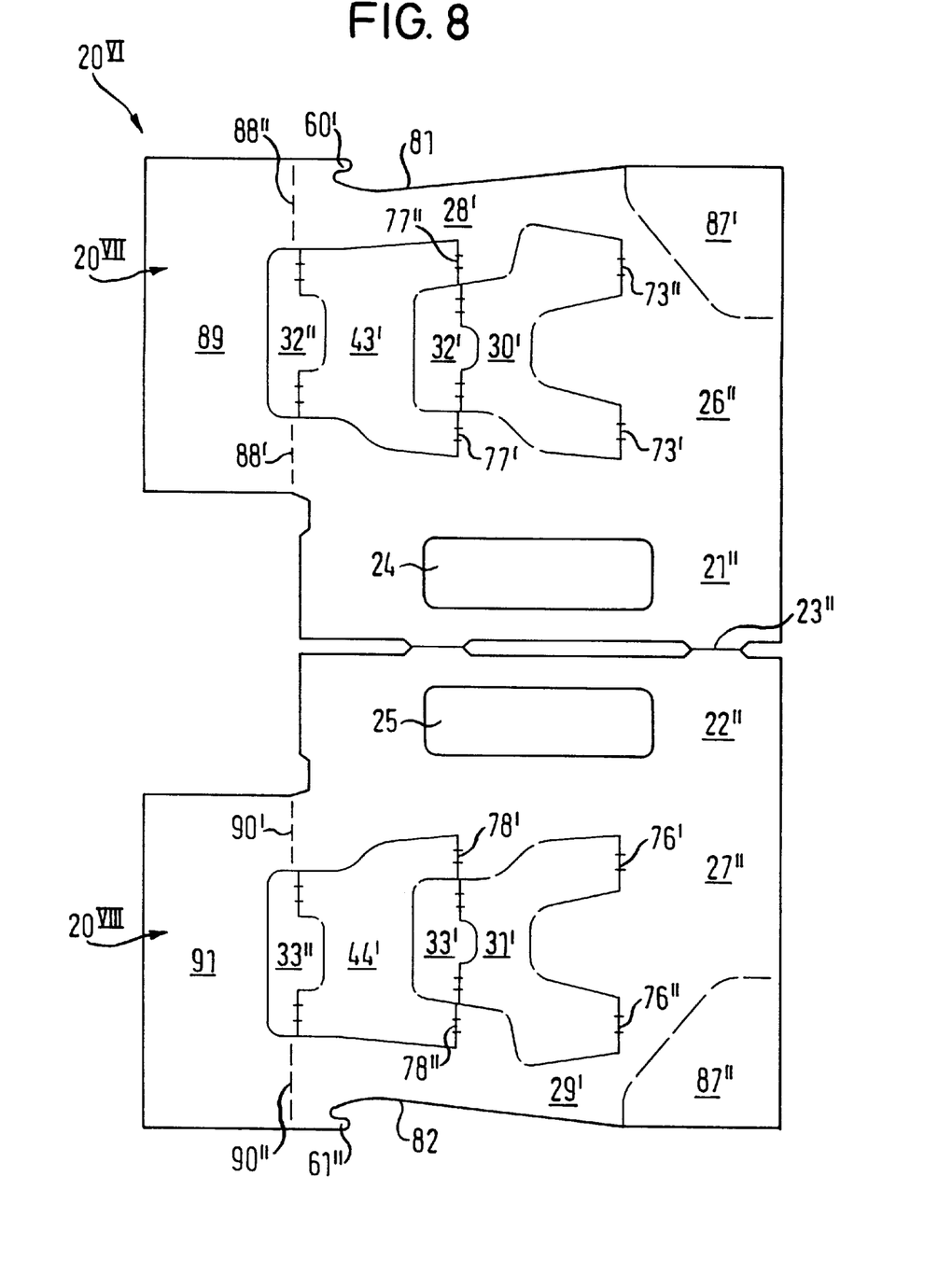
FIG. 8 a flatly opened out blank of the same container carrier, in a plan view.

The blank 20$^{VI}$ shown in FIG. 8 for an associated middle wall is again punched as one piece from an uncoated recycling cardboard. It has two sections 20$^{VII}$, 20$^{VIII}$ which are linked to one another on the longitudinal side at 23", wherein this linking is interrupted by punching-outs.

Bordering on the linking 23" the sections 20$^{VII}$ 20$^{VIII}$ in each case comprise a grip section 21', 22", which in each case comprise a grip opening 24, 25. The grip sections 21", 22" in each case have a lateral connecting section 26", 27" which is extended away from the linking 23". At the foot of the lateral connecting sections 26", 27" roughly triangular reinforcement parts 87', 87" are releasably fixed via bridged punching lines. Further from the foot of the lateral connecting sections 26', 27" there extends in each case a lower connecting section 28', 29' roughly parallel to the linking 23". On the lower edge of the lower connecting section 28', 29' again there are formed a hook section 60', 61' and a prior arranged returning edge region 81, 82.

To the lateral connecting sections 26', 27" via linkings 73', 73" and 76', 76" there are linked transverse flaps 30', 31'. These are provided with transverse flap connecting tabs 32', 33'. Further to the grip sections 21", 22" at 77', 78' and to the lower connecting sections 28', 29' at 77', 78" there are linked transverse flaps 43', 44'. These in turn comprise transverse flap connecting tabs 32", 33".

Finally to the grip section 21" at 88' and to the lower connecting section 28' at 88" there is linked an end tab 89 and to the grip section 22" at 90' and the lower connecting section 29' at 90" an end tab 91. The end tabs 89, 91 have a roughly rectangular shape.

For the assembly of a container carrier the inner grip section 85', 85" of the blank 1" are folded against the inner sides of the grip sections 13", 14" and are adhesed to these. Then the blank 20$^{IV}$ is applied against the inner side of the blank 1" so that the linkings 23" and 7' come to overlap and the outer transverse sides of the lateral connecting sections 26", 27" are arranged roughly over the linkings 83', 83".

With this the grip sections 21", 22" are adhesed to the grip sections 13", 14" and 85', 85" respectively. Further the transverse flap connecting tabs 32', 32" and 33', 33" are adhesed to the lateral walls 3, 5. Also the reinforcement sections 87', 87" are adhesed to the end wall sections 4', 4".

Afterwards the blank 1" is folded together about the fold line 7'. With this the inner sides of the end wall tabs 64, 64" and the end wall tabs 64", 64$^{IV}$ are in each case adhesed to one another. Furthermore the grip sections 21", 22", the lateral connecting sections 26", 27" and the lower connecting sections 28', 29' are in each case adhesed to one another. Finally the floor wall 9 is folded about the middle fold line 10 and is adhesed to the floor tab 12.

The completed container carrier may be assembled out of the flatly lying condition in that one presses against the linking of the end wall sections 4', 4" and the linking of the lateral walls 3, 5 onto the end wall sections 2', 2". With this the transverse flaps 30', 31', 43', 44' and the end tabs 89, 91 are folded away from the middle wall 22$^{VI}$ and where appropriate ever present bridges of the punching lines broken open. Furthermore the reinforcement parts 87', 87" are separated from the middle wall $20^{VI}$ and stay back at the end wall sections 4', 4" by which means the lower regions thereof are reinforced. The end wall sections 2', 2" are reinforced by the end tabs 89, 91.

Further the floor 9 is stretched out and may be hung into the hooks 60', 61' with the receiver 11 in order to stabilize the extended out formation.

What is claimed is:

1. A container carrier for containers comprising:
   a box-shaped carrier of a first foldable flat material, with a floor wall, lateral walls the lateral walls being separated by a first middle fold line and having longitudinal sides, and end walls, the end walls being connected to the lateral walls and having an inner surface, the box-shaped carrier further having at least one of the end walls on either side of the first middle fold line;
   a middle wall parallel to the lateral walls of a second foldable flat material with transverse flaps which can be folded out, for forming compartments for the containers, in which
   the box-shaped carrier end walls having reinforcements comprising at least one layer of foldable flat material connected to the box-shaped carrier end walls, wherein the at least one layer of foldable flat material lies flat on and is attached to the inner surface of the end walls;
   to the end walls on both sides of a first middle fold line there is allocated a reinforcement;
   the first foldable flat material is a reinforced cardboard and
   the second foldable flat material is a recycling cardboard.

2. A container carrier according to claim 1, wherein the box-shaped carrier is open at the top.

3. A container carrier according to claim 2, wherein the box-shaped carrier on an end wall has grip sections which comprise grip openings and which are folded about a middle fold line in continuation of the first middle fold line, against the middle wall, and are connected to the middle wall.

4. A container carrier according to claim 3, the middle wall having grip sections wherein the grip sections of the middle wall and of the box-shaped carrier are adhered together with grip openings equally overlapping.

5. A container carrier according to claim 1, wherein the middle wall includes a carrier grip.

6. A container carrier according claims 1, wherein the box-shaped carrier is manufactured of a one-piece blank of the first foldable flat material.

7. A container carrier according to claim 1, wherein the box-shaped carrier is manufactured from a blank of the first foldable flat material which is pressed, punched and adhesively joined to form the box-shaped carrier.

8. A container carrier according to claim 1, wherein the carrier container on the transverse sides has lateral and end walls which are linked to one another, with a lateral tab connecting a lateral wall to an end wall on the transverse side, and floor wall sections linked to the longitudinal sides of the lateral walls.

9. A container carrier according to claim 8, wherein the middle wall at both ends has two end tabs projecting on differing sides thereof and wherein the two end tabs at the one end are connected to the neighboring lateral wall and the two end tabs at the other end bear on the neighbouring end wall.

10. A container carrier according to claim 1, wherein the box-shaped carrier has first and second sections separated by a fold line, each section comprised of a lateral wall with two end wall sections attached to opposite sides of the lateral wall, each end wall section including an end wall tab, the first and second sections attached to each other by folding along the fold line and connecting the end wall tabs together, and floor wall sections linked to the longitudinal sides of the lateral walls.

11. A container carrier according to claim 10, wherein the box-shaped carrier has two parted end walls and the end wall tabs connected to one another are folded against one another.

12. A container carrier according to claim 10, wherein the middle wall at one end has an end tab which is connected to the neighboring end wall which on the other side of the middle wall has a reinforcement section, wherein further the middle wall at the other end is connected to the end wall tabs of the neighboring end wall which on both sides of the middle wall has reinforcement sections.

13. A container carrier according to claim 10, the middle wall having first and second sides, each side having first and second ends, wherein the middle wall at the first and second ends of both sides are connected to the end wall tabs of the neighboring end walls of the box-shaped carrier, the middle wall at the first ends on both sides is connected to the neighboring end wall via end tabs, and at the second ends, which comprise the reinforcement parts which are separated from the middle wall, is connected to the neighboring end walls.

14. A container carrier according to claim 1, wherein the end walls have a middle fold line aligned in a transverse direction relative to the lateral walls and the floor wall has a middle fold line aligned in a longitudinal direction relative to the lateral walls for the flat folding together of the box-shaped carrier.

15. A container carrier according to claim 1, wherein the box-shaped carrier is reinforced at least in a lower section of the end walls.

16. A container carrier according to claim 15, wherein the reinforcements are formed by reinforcement sections thereof, which are linked to the end walls and folded against the end walls, end tabs on a neighboring end of the middle wall, and reinforcement parts separated from the middle wall.

17. A container carrier according to claim 16, wherein at least one end wall section comprises at least one reinforcement section linked to its lower edge.

18. A container carrier according to claim 1, wherein the reinforcements are arranged on the inner side of the end walls.

19. A container carrier according to one of the claim 1, wherein the second foldable flat material is an uncoated recycling cardboard.

20. A container carrier according to one of claim 1, wherein the middle wall is manufactured of a one-piece blank of recycling cardboard.

21. A container carrier according to claim 1, wherein the middle wall is manufactured from a blank of recycling cardboard which is punched and adhesively joined to form the middle wall for the container carrier.

22. A container carrier according to claim 1, wherein the middle wall has at least one grip section comprising a grip opening.

23. A container carrier according to claim 1, wherein the transverse flaps are connected to the lateral walls of the box-shaped carrier via transverse flap connecting tabs.

24. A container carrier according to claim 1, wherein the middle wall on at least one end is connected to the neighboring end wall via at least one end tab.

25. A container carrier according to claim 1, wherein the middle wall has end tabs which are connected to the lateral walls via linked end side tabs.

26. A container carrier according to claim 25, wherein at differing ends of the middle wall, end tabs arranged on the same side of the middle wall in each case comprise a common end side tab.

27. A container carrier according to claim 25, wherein the end side tabs via a section are connected to a transverse flap connecting tab in each case of the same side of the middle wall.

28. A container carrier according to claim 1, wherein the middle wall at the lower edge comprises at least one hook and the floor wall comprises an allocated receiver for the hook.

29. A container carrier according to claim 28, wherein the middle wall comprises the hook at one end.

30. A container carrier according to claim 1, wherein at least a portion of the middle wall is multi-layered with a connection between the layers.

31. A container carrier according to claim 1, wherein the middle wall comprises middle wall sections folded together and connected to one another substantially flatly.

32. A container carrier according to claim 31, wherein the middle wall sections ($20^{VII}$, $20^{VIII}$) comprise grip sections (21", 22"), the grip sections each having a longitudinal side, the middle wall sections being linked together along the longitudinal sides (23") of the grip sections, and comprise lateral connecting sections (26", 27"), said grip sections (21", 22") and lateral connecting sections (26", 27") bearing on one another and being connected to one another, the grip sections and the lateral connecting sections forming corner regions therebetween, wherein in the corner regions between the grip sections (21', 22") and the lateral connecting sections (26", 27") there are arranged transverse flaps (30', 31', 43', 44') and transverse flap connecting tabs (32', 33', 32", 33").

33. A container carrier according to claim 32, wherein the middle wall sections ($20^{VII}$, $20^{VIII}$) further comprising lower connecting sections (28', 29') connected to the lower end of the lateral connecting sections (26", 27") below the transverse flaps (30', 31', 43', 44') and transverse flap connecting tabs (32', 33', 32", 33"), said lower connecting sections (28', 29') bearing on one another and being connected to one another.

34. A container carrier according to claim 33, wherein the lower connecting sections are connected to end wall tabs of end wall sections.

35. A container carrier according to claim 34, wherein the middle wall sections in each have end tabs linked to the grip sections and the lower connecting sections.

36. A container carrier according to claim 35, wherein the joinings between any of the separate pieces which hold the container carrier together are at least partially formed with adhesive.

37. A container carrier according to claim 33, wherein the lateral connecting sections are connected to end wall tabs of end wall sections.

38. A container carrier according to claim 32, wherein the middle wall comprises inner grip sections which are linked to the other side of the grip sections, are linked to one another, are folded against the inner side of the grip sections and are connected to these and as a result of the folding together of the middle wall sections are folded against one another and are connected to one another.

39. A container carrier according to claim 38, wherein the inner grip sections at the side distant to their mutual linking have in each case an inner connecting section, wherein their inner connecting sections as a result of the folding together of the middle wall sections are folded against one another and are connected to one another, wherein in each case in the corner region between the inner grip section and the inner connecting section a transverse flap is linked to the respective inner connecting section which on the other side is linked to a neighboring transverse flap connecting tab.

40. A container carrier according to one of the claim 32, wherein edge tabs linked to one another are linked to the side of the grip sections, which is allocated to the lateral connecting sections, said edge tabs being folded against the inner sides of the grip sections and the lateral connecting sections and are connected to these, as a result of the folding together of the middle wall sections, are folded against one another and are connected to one another and in continuation of their linking line have end tabs which are linked to the grip sections and which are connected to a neighboring end wall of the carrier container.

41. A container carrier according to claim 32, wherein to lower edge regions of the transverse flap connecting tabs there are connected end side tabs which on a section extended away from the end tabs have further end tabs linked on the end side, said further tabs having further edge tabs which are linked to their side lying opposite their linking and which are linked to one another, wherein the further end tabs are folded about their linkings to the end side tabs, the further edge tabs are folded against the inner grip sections and are connected to these and the further edge tabs as a result of the folding together of the middle wall sections are folded against one another and connected to one another.

42. A container carrier according to claim 41, wherein the further edge tabs at the lower edge in each case have a hook section, wherein the hook section may be folded together equally overlapping.

43. A container carrier according to claim 32, wherein at least one end of the reinforcement parts (87', 87") are separated from the middle wall sections ($20^{VII}$, $20^{VIII}$).

* * * * *